(12) United States Patent
Clark

(10) Patent No.: US 10,059,459 B2
(45) Date of Patent: Aug. 28, 2018

(54) UNMANNED AERIAL VEHICLE RECOVERY SYSTEM

(71) Applicant: Kespry, Inc., Menlo Park, CA (US)

(72) Inventor: Robert Parker Clark, Palo Alto, CA (US)

(73) Assignee: Kespry Inc., Menlo Park, CA (US)

( * ) Notice: Subject to any disclaimer, the term of this patent is extended or adjusted under 35 U.S.C. 154(b) by 0 days.

(21) Appl. No.: 14/723,897

(22) Filed: May 28, 2015

(65) Prior Publication Data

US 2016/0347462 A1  Dec. 1, 2016

(51) Int. Cl.
| | |
|---|---|
| *G05D 1/00* | (2006.01) |
| *G05D 1/08* | (2006.01) |
| *G05D 3/00* | (2006.01) |
| *G06F 7/00* | (2006.01) |
| *G06F 17/00* | (2006.01) |
| *B64D 17/62* | (2006.01) |
| *B64C 39/02* | (2006.01) |
| *B64D 43/02* | (2006.01) |

(Continued)

(52) U.S. Cl.
CPC ............ *B64D 17/62* (2013.01); *B64C 39/024* (2013.01); *B64D 17/80* (2013.01); *B64D 43/02* (2013.01); *G05D 1/0072* (2013.01); *G05D 1/0088* (2013.01); *G05D 1/105* (2013.01); *B64C 2201/185* (2013.01)

(58) Field of Classification Search
USPC .......................................................... 701/7
See application file for complete search history.

(56) References Cited

U.S. PATENT DOCUMENTS 4,914,572 A  *  4/1990  Bitzinger ............... G06F 11/10
                                                      379/15.01
5,550,736 A     8/1996  Hay et al.
(Continued)

FOREIGN PATENT DOCUMENTS

CN       202944566 U  *  5/2013
CN       103708037 A  *  4/2014
(Continued)

OTHER PUBLICATIONS

NPL google translation of Automatic parachute throwing protective device of minitype unmanned aerial vehicle (UAV) out of control CN 202944566 U (filed on Oct. 29, 2012).*
(Continued)

*Primary Examiner* — Jean Paul Cass
(74) *Attorney, Agent, or Firm* — Veros Legal Solutions, LLP

(57) ABSTRACT

An unmanned aerial vehicle includes a closely integrated emergency recovery and operation systems for an unmanned aerial vehicle with built-in levels of redundancy and independence to maximize the likelihood of a controlled velocity landing. The unmanned aerial vehicle may include multiple processors and multiple state estimating modules such as inertial measurement units to independently determine the operational and error status of the unmanned aerial vehicle. Base on predictive or projected computations, the emergency recovery system may determine a suitable time for a recovery action, such as parachute deployment, and execute the recovery action.

24 Claims, 6 Drawing Sheets

(51) Int. Cl.
*B64D 17/80* (2006.01)
*G05D 1/10* (2006.01)

(56) References Cited

U.S. PATENT DOCUMENTS

| | | | |
|---|---|---|---|
| 6,142,421 A * | 11/2000 | Palmer | B64C 39/024 |
| | | | 220/4.13 |
| 6,260,797 B1 * | 7/2001 | Palmer | B64C 39/024 |
| | | | 102/501 |
| 6,471,160 B2 | 10/2002 | Grieser | |
| 6,685,140 B2 * | 2/2004 | Carroll | B64C 39/024 |
| | | | 244/139 |
| 7,918,419 B2 | 4/2011 | Rosenfield et al. | |
| 8,191,831 B2 | 6/2012 | Nadir | |
| 8,543,255 B2 | 9/2013 | Wood et al. | |
| 9,513,635 B1 * | 12/2016 | Bethke | G01C 21/20 |
| 9,781,609 B1 * | 10/2017 | Kurtz | H04W 24/02 |
| 2001/0048050 A1 | 12/2001 | Grieser | |
| 2001/0048051 A1 | 12/2001 | Redding et al. | |
| 2003/0057327 A1 | 3/2003 | Carroll | |
| 2003/0066932 A1 * | 4/2003 | Carroll | B64C 39/024 |
| | | | 244/120 |
| 2005/0183569 A1 | 8/2005 | Solomon | |
| 2010/0004803 A1 | 1/2010 | Manfredi et al. | |
| 2011/0035149 A1 | 2/2011 | McAndrew et al. | |
| 2012/0022719 A1 | 1/2012 | Matos | |
| 2014/0032034 A1 | 1/2014 | Raptopoulos et al. | |
| 2014/0288730 A1 * | 9/2014 | Fucke | B64C 19/00 |
| | | | 701/3 |
| 2017/0192418 A1 * | 7/2017 | Bethke | B64C 39/024 |
| 2018/0002010 A1 * | 1/2018 | Bauer | B64C 29/0025 |

FOREIGN PATENT DOCUMENTS

| | | | | |
|---|---|---|---|---|
| CN | 103895870 A * | 7/2014 | | |
| WO | WO 2010002437 A2 * | 1/2010 | | B64D 25/00 |
| WO | WO 2013124852 A1 * | 8/2013 | | G05D 1/0676 |
| WO | WO 2014/080409 A1 | 5/2014 | | |
| WO | WO 2015/059703 A1 | 4/2015 | | |

OTHER PUBLICATIONS

International Search Report and Written Opinion in Application No. PCT/US2016/032733 dated Oct. 13, 2016.

International Preliminary Report on Patentability dated Sep. 11, 2017 for International Application No. PCT/US2016/032733 filed on May 16, 2016.

* cited by examiner

UNMANNED AERIAL VEHICLE RECOVERY SYSTEM

BACKGROUND

Field

The described technology generally relates to unmanned aerial vehicles and, more specifically, to recovery of unmanned aerial vehicles.

Description of the Related Art

An unmanned aerial vehicle, also commonly referred to as drone, can travel through a variety of environments, such as indoor, outdoor, and/or mixed indoor and outdoor environments. In some cases, an unmanned aerial vehicle can be configured to conduct surveillance, security, delivery, monitoring, or other tasks that can comprise combining movement and data collection. The unmanned aerial vehicle can travel over surface on which the unmanned aerial vehicle cannot safely land (e.g., water).

SUMMARY

The methods and devices of the described technology each has several aspects, no single one of which is solely responsible for its desirable attributes.

In one embodiment, an unmanned aerial vehicle includes a primary operation system in communication with a primary state estimator, the primary operation system being configured to operate the unmanned aerial vehicle based in part on the primary state estimator. The unmanned aerial vehicle also includes a flight failure recovery system in communication with the primary operation system and a recovery state estimator, the flight failure recovery system being configured to generate a deploy signal based at least in part on one or more signals from the recovery state estimator.

In another embodiment, a method for recovering an unmanned aerial vehicle includes operating the unmanned aerial vehicle based in part on a primary state estimator and generating a deploy signal based at least in part on one or more signals from a flight failure recovery state estimator.

In another embodiment, an intelligent emergency parachute deployment system for an unmanned aerial vehicle includes a parachute deployment system, a dedicated inertial measurement unit (IMU) comprising a gyroscope and an accelerometer, and a processor coupled to the dedicated IMU, the parachute deployment system, and a primary operation system for the unmanned aerial vehicle.

In another embodiment, a method for flight failure recovery of an unmanned aerial vehicle includes operating the unmanned aerial vehicle based in part on a primary state estimator, and generating a flight failure recovery signal based at least in part on one or more signals from a flight failure recovery state estimator.

In another embodiment, a method for flight failure recovery of an unmanned aerial vehicle includes determining that flight failure has occurred, measuring status parameters of the unmanned aerial vehicle for a time period following the determining, and deploying a descent mechanism based at least in part on the measured status parameters.

BRIEF DESCRIPTION OF THE DRAWINGS

These drawings and the associated description herein are provided to illustrate specific embodiments of the described technology and are not intended to be limiting.

DETAILED DESCRIPTION

Figure 1:
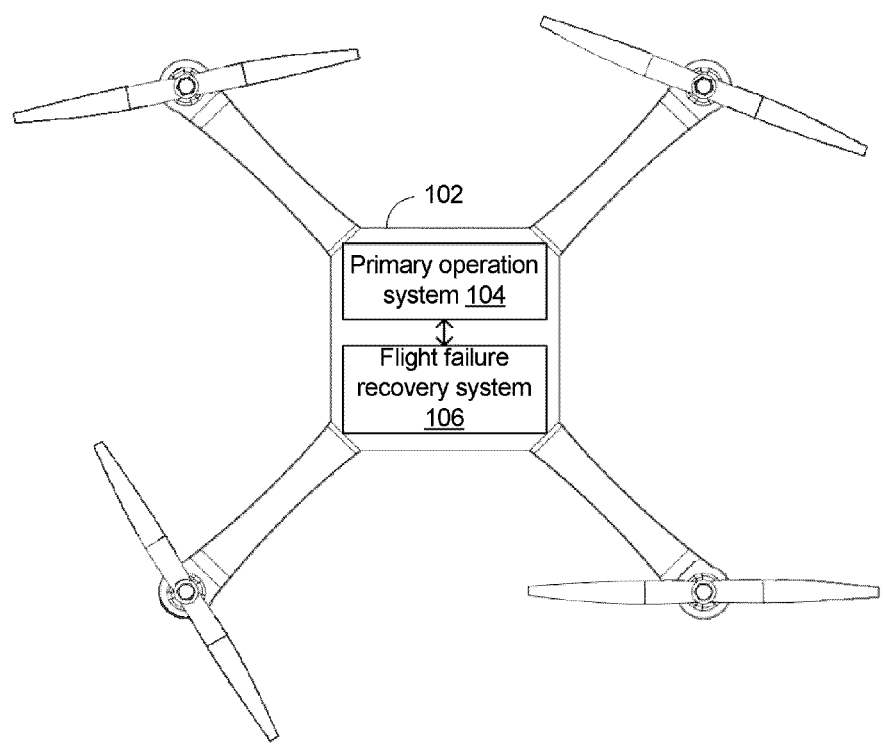
FIG. 1 is a diagram showing example internal systems enclosed in an unmanned aerial vehicle according to one embodiment.

Various aspects of the novel systems, apparatuses, and methods are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wired and wireless technologies, system configurations, networks, including optical networks, hard disks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The term "unmanned aerial vehicle," or "UAV," as used herein, generally refers to a vehicle that is configured to operate without substantial or any involvement from an on-board operator (e.g., a pilot or driver). An unmanned aerial vehicle can operate autonomously or semi-autonomously. An unmanned aerial vehicle can be an aircraft that is configured to automatically take off and land on a surface. In some cases, an unmanned aerial vehicle can automatically travel from one location to another without any operator involvement. In some cases, an unmanned aerial vehicle can travel a far distance from a starting point. The distance can be far enough that the unmanned aerial vehicle cannot return to a starting point without refueling or recharging at an intermediate location. An unmanned aerial vehicle can be configured to land on a landing pad and/or charge at a charging station.

An unmanned aerial vehicle can be used to perform missions in an open and/or distant airspace. The missions performed by the unmanned aerial vehicle can be pre-programmed to one or more processors of the unmanned aerial vehicle or can be communicated to the one or more processors during its flight in real time. Furthermore, the unmanned aerial vehicle can be configured to alter a course of action in pursuing its missions based on its surroundings. As the unmanned aerial vehicle performs its missions, it may encounter emergency situations either expected or unexpected. Various predictive computations can be implemented in the one or more processors of the unmanned aerial vehicle to respond to such emergency situations, and in other instances the unmanned aerial vehicle may be configured to take a pre-set default course of action based on its status. The disclosure herein describes a closely integrated flight failure recovery system for an unmanned aerial vehicle with built-in levels of redundancy and independence.

FIG. 1 is a diagram showing example internal systems enclosed in an unmanned aerial vehicle according to one embodiment. The unmanned aerial vehicle illustrated in FIG. 1 includes an aerial vehicle body 102 having a primary operation system 104 and a flight failure recovery system 106. As the name implies, a flight failure recovery system is intended to be activated in the event that controlled flight is no longer reasonably possible for the UAV. Such situations might occur in the event of a mid-air collision, sudden battery failure or other flight-critical component failure, or onboard fire that disables or deactivates motor drive and/or control systems of the UAV. In the event of such a flight failure, an essentially immediate and uncontrolled descent is unavoidable, in contrast with less catastrophic problems (such as low but not yet dead battery) where controlled flight back to the home base or other known safe landing area can still be performed. In this event, it is advantageous to at least slow the descent of the UAV such that it is partially controlled in rate of descent to minimize damage to the UAV itself as well as possible structures, vehicles, or even people that the UAV might impact as it reaches the ground. Most commonly, a flight failure recovery system includes a parachute, as this is an economical and long established method of slowing descent of an aircraft that can no longer stay aloft in a controlled manner using its normal propulsion system. The systems described below incorporate a parachute as a specific implementation. However, it will be appreciated that other flight failure recovery methods could also be used with the inventive principles applied to a parachute system below, such as various forms of airfoils, short term booster rockets, or the like. The inventive principles described herein could also be used in conjunction with what may be termed an urgent controlled descent, where travelling back to a home location or other known safe area is not attempted, but the normal flight system can be used to slow and/or partially control an essentially immediate descent without using a parachute.

As further discussed below in connection with FIGS. 2-3, the primary operation system 104 and the flight failure recovery system 106 are in communication with each other to implement a redundant powering and state estimation scheme. The disclosure herein can be implemented in a system with varying degrees of redundancy accompanied by appropriate levels of communication between the primary operation system 104 and the flight failure recovery system 106. In certain embodiments, the primary operation system 104 and the flight failure recovery system 106 may be implemented into two independent systems, and in other embodiments, the primary operation system 104 and the flight failure recovery system 106 may be implemented in overlapping systems sharing one or more components with each other. As further discussed below, close communication between the primary operation system 104 and the flight failure recovery system 106 and increasing the level of redundancy and independence may be beneficial to the recovery of the unmanned aerial vehicle, as such unmanned aerial vehicle system can have multiple levels of checks on the status of the aerial vehicle and initiating a recovery process accordingly.

Although the illustrated aerial vehicle in FIG. 1 is a quadcopter having four arms with their respective rotors, the disclosure herein can be implemented in other types of unmanned aerial vehicles such as a multirotor helicopter having a different number of arms and/or rotors or an aerial vehicle other than a multirotor helicopter such as fixed wing or vertical take off and landing (VTOL). Furthermore, the primary operation system 104 and the flight failure recovery system 106 illustrated in FIG. 1 are functional representations of the systems, and the aerial vehicle body 102 including the primary operation system 104 and the flight failure recovery system 106 may be implemented in one physically integrated structure, a unibody structure having one or more internal compartments, or any other suitable physical enclosures.

Figure 2:
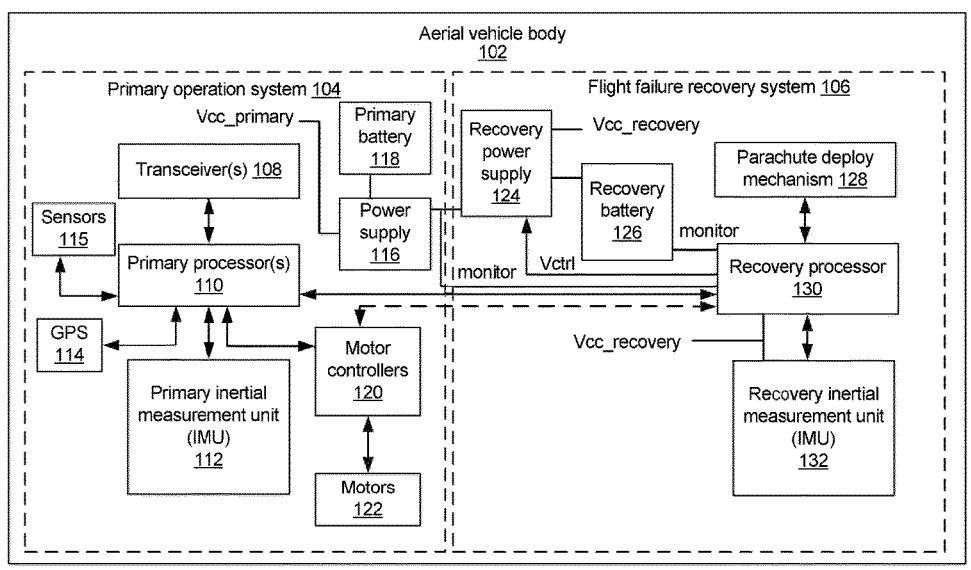
FIG. 2 is a diagram showing an example primary operation system and an example flight failure recovery system of FIG. 1.

FIG. 2 is a diagram showing an example primary operation system and an example flight failure recovery system of FIG. 1. The primary operation system 104 illustrated in FIG. 2 includes one or more primary processor(s) 110 in communication with a primary state estimator. The primary state estimator incorporates at least one, and often more than one sensor such as accelerometers, gyroscopes, magnetometers, and/or barometers that can be used to estimate at least some parameters of the state of the UAV and/or changes in such parameters, such as at least one of velocity, attitude, and altitude. The primary state estimator may be a primary inertial measurement unit (IMU) 112 incorporating one or more of the above described sensors. The primary processor 110 is in further communication with one or more transceivers 108, sensors 115, a global positioning system (GPS) module 114, and motor controllers 120, which are in communication with motors 122. The primary operation system 104 further includes a power supply 116 and a primary battery 118, which provides power to one or more modules of the primary operation system 104, including the primary processor 110. The transceivers 108 and the GPS module 114 may be in further communication with their respective antennas (not shown).

The flight failure recovery system 106 includes a recovery processor 130 in communication with a recovery state estimator which may also be an IMU 132. The recovery processor 130 is in further communication with a parachute deploy mechanism 128 of the flight failure recovery system 106 and the primary processor 110 of the primary operation system 104. The flight failure recovery system 106 further includes a recovery power supply 124 and a recovery battery 126, which provides power to one or modules of the flight failure recovery system 106, including the recovery processor 130 and the recovery IMU 132. The primary operation system 104 and the flight failure recovery system 106 may include additional or intermediate modules, drivers, controllers, circuitries, lines of communication, and/or signals not illustrated in FIG. 2.

The primary operation system 104 can be responsible for regular operation of the unmanned aerial vehicle according to instructions executed by the primary processor 110 to, for example, take a course of action for a mission. The primary processor 110 can be a microprocessor capable of communicating with various modules illustrated in FIG. 2 executing instructions either pre-programmed or received during a mission, for example. The primary processor 110 may receive data from the sensors 115, the transceivers 108, the GPS module 114, and the primary IMU 112, and the motor controllers 120 to evaluate the status of the aerial vehicle and determine a course of action. The status of the aerial vehicle can also be determined based on data received through the sensors 115 or preloaded data. For example, the altitude of the unmanned aerial vehicle above ground can be determined by the primary processor 108 based on a digital elevation model (DEM) of a world elevation map or with LIDAR, a barometer, or ultrasound. In some embodiments, the primary operation system 104 may include multiple processors of varying levels of computing power and reliability to execute low-level instructions or run high-level application code, such as a virtual machine. In such embodiments, one or more of the functionalities of the primary processor(s) 110 described herein may instead be performed by another processor in the primary operation system 104.

The transceivers 108 can be devices capable of transmitting and receiving data to and from a system, device, or module external to the unmanned aerial vehicle. For example, the transceivers 108 may include radio frequency (RF) transceivers capable of communicating data over a Wi-Fi network or any other suitable network in various frequency bands or channels, such as 900 MHz, 2.4 GHz, 5 GHz, etc. In some embodiments, the transceivers 108 may be implemented with a combination of separate transmitters and receivers. The sensors 115 may include one or more proximity sensors using, for example, infrared, radar, and/or sonar technology. The sensors 115 may also include other types of sensors gathering data regarding visual fields, auditory signals, and/or environmental conditions (e.g., temperature, humidity, pressure, etc.). The GPS module 114 may include a GPS transceiver and/or a GPS driver configured to receive raw and/or processed GPS data such as ephemerides for further processing within the GPS module, with the primary processor 110, or both.

The primary IMU 112 may include a stand-alone IMU chip containing one or more magnetometers, gyroscopes, accelerometers, and/or barometers. In some embodiments, the primary IMU 112 may be implemented using a combination of multiple chips or modules configured to perform, for example, measuring of magnetic fields and vehicle orientation and position and velocity and acceleration and to generate related data for further processing with the primary processor 110. The motor controllers 120 may include a controller device or circuit configured to interface between the primary processor 110 and the motors 122 for regulating and controlling rotational speed and direction, torque, or other operational parameters of their respective, coupled motors 122. In some embodiments, one or more motor control schemes, such as a feedback control loop, may be implemented with the primary processor 110 and/or the motor controllers 120. The motors 122 may include electrical or any other suitable motors coupled to their respective rotors of the unmanned aerial vehicle to control their propellers, for example. The primary operation system 104 may also include one or more cameras (not shown) to gather images and/or video, a microphone (not shown) to gather audio data, and a memory storage device (e.g., random-access memory, read-only memory, flash memory, or solid state storage (SSD)) (not shown) to store data collected from the sensors 115, data processed in the primary processor 110, or preloaded data.

The flight failure recovery system 106 can be responsible for recovery operation of the unmanned aerial vehicle to, for example, safely deploy a parachute and land the unmanned aerial vehicle. The recovery processor 130 can be a microprocessor capable of communicating with various modules illustrated in FIG. 2 either pre-programed or received during a mission for the purpose of smart and safe recovery. The recovery processor 130 may receive data from the recovery IMU 132 and send and receive data to and from the primary processor 110 to evaluate the status of the unmanned aerial vehicle and determine and execute a recovery course of action, such as selecting a time of parachute deployment or controlling properly functioning parts of the aerial vehicle in an event of an emergency. Depending on the built-in levels of redundancy and primary-recovery system independence, the data communicated between the primary processor 110 and the recovery processor 130 may vary, and an order of priority in instructions in the primary and recovery processors 110, 130 may be implemented. For example, the status of the unmanned aerial vehicle, such as the altitude above ground, can be independently determined by the recovery processor 130 using a digital elevation model (DEM) of a world elevation map or with LIDAR, a barometer, or ultrasound. Depending on the level of redundancy, the flight failure recovery system 106 may also include its own system of one or more modules similar to the ones in the primary operation system 104 discussed above, or it may rely temporarily or permanently on some or all of the processing and sensing systems of the primary operation system 104. Further details of smart recovery decision making are discussed in connection with FIGS. 4-6 below.

The recovery IMU 132 may include a stand-alone IMU chip containing one or more magnetometers, gyroscopes, accelerometers, and/or barometers. In other embodiments, the recovery IMU 132 may be implemented using a combination of chips or modules configured to perform measuring of magnetic fields and vehicle orientation and acceleration and to generate related data for further processing with the recovery processor 130. The recovery processor 130 is also in communication with the parachute deploy mechanism 128, which may include an electromechanical mechanism allowing deployment of a parachute at a time selected by the recovery processor 130. Further details of the parachute deploy mechanism 128 are discussed in connection with FIG. 3 below.

In some embodiments, the recovery processor 130 may be in further communication with (not all shown) other parts of the primary operation system 104, such as the GPS module 114, the sensors 115, the transceivers 108, or the motor controllers 120 to execute or assist an emergency course of action, such as controlled descent, flight failure recovery, recovery landing, and/or parachute deployment as disclosed herein. Further communications between the recovery processor 130 and various modules of the primary operation system 104 may be advantageous as they can increase redundancy and enhance inter-system checks between the primary and the recovery systems 104, 106. For example, the recovery processor 130 may determine that although the primary processor 110 is malfunctioning, other parts of the primary operation system 104 are operational. In such instance, the primary propulsion mechanism through the primary processor 110 can be compromised, and a flight failure recovery may be necessary. In embodiments having the recovery processor 130 in communication with the motor controllers 120, for example, the recovery processor 130 may take full control over the motors 122 and initiate an urgent controlled descent. In such embodiments, the recovery processor 130 may determine that either parachute deployment is unnecessary or not feasible according to parts of the processes described in connection with FIGS. 4-6 below. In such instance, the recovery processor 130 can initiate a flight failure recovery process by setting the rotor speed slightly below the hovering speed to allow controlled vertical descent to ground.

The power supply 116 may include a circuitry configured to receive power from the primary battery 118 and send output power to the recovery battery 126 through the recovery power supply 124. In some embodiments, the power supply 116 includes voltage regulators with outputs directly powering the primary operation system 104. The recovery battery 126, through the recovery power supply 124, powers the flight failure recovery system 106. Each of the primary battery 118 and the recovery battery 126 can be a multi-cell lithium battery or any other suitable battery each capable of powering the primary operation system 104 or the flight failure recovery system 106. Further details of the recovery power supply 124 and the flight failure recovery system 106 are discussed in connection with FIG. 3 below.

Figure 3:
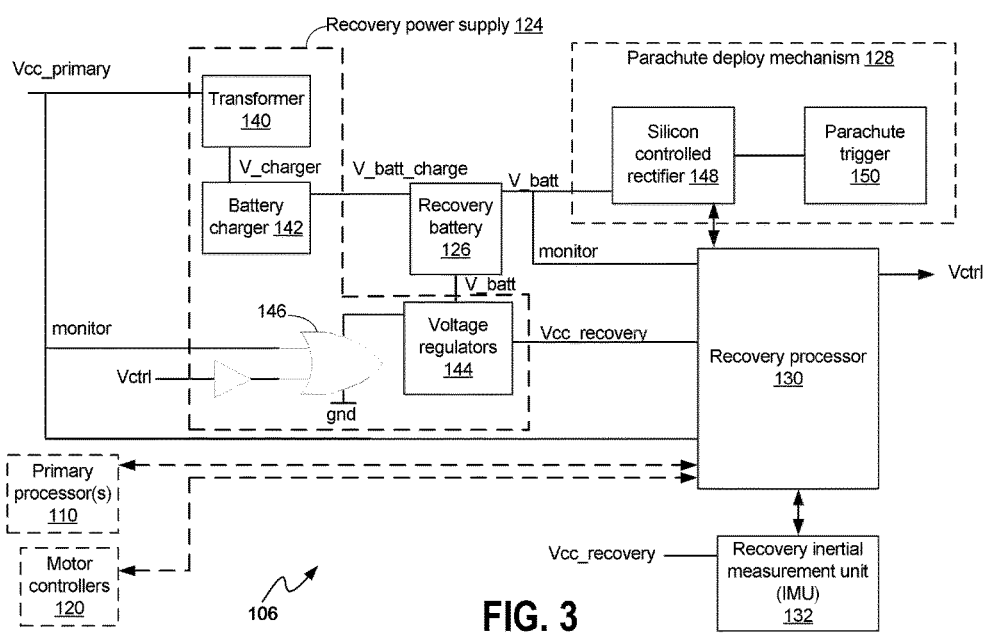
FIG. 3 is a diagram showing an example flight failure recovery system of FIG. 2.

FIG. 3 is a diagram showing an example flight failure recovery system of FIG. 2. The recovery power supply 124 of the flight failure recovery system 106 illustrated in FIG. 3 includes a transformer 140, a battery charger 142, voltage regulators 144, and a logic circuit 146. The parachute deploy mechanism 128 of the flight failure recovery system 106 illustrated in FIG. 3 includes a silicon-controlled rectifier 148 and a parachute trigger 150. As disclosed herein, the example powering scheme allows the flight failure recovery system 106 to determine whether to shut portions of itself off to prevent inadvertent activation, during ground based handling for example. The primary operation system 104 can be powered on through the power supply 116 (FIG. 2) and the primary battery 118 (FIG. 2), and the power signal from the primary operation system 104, Vcc_primary, can be supplied to the transformer 140 of the recovery power supply 124 to provide power to the battery charger 142, which can charge the recovery battery 126. In some embodiments, the transformer 140 can be a step-up transformer, stepping up, for example, 5V Vcc_primary to 10V V_charger as the battery charger 142 may operate with a higher voltage than the voltage from the primary operation system 104. In other embodiments, the transformer 140 may not be necessary or the transformer 140 can be a step-down transformer as different circuitries can be used to implement the primary operation system 104 and the flight failure recovery system 106.

The recovery battery 126 generates battery voltage, V_batt. The battery voltage from the recovery battery 126 can power the silicon-controlled rectifier 148 of the parachute deploy mechanism 126 and powers the voltage regulators 144 of the recovery power supply 124. The voltage regulators 144 then can generate a voltage to power the logic circuit 146 and a recovery system voltage, Vcc_recovery, to power the recovery processor 130 and the recovery IMU 132. The recovery system voltage may depend on the requirements of the logic circuit 146, the recovery processor 130, and the recovery IMU 132, such as 3.3V as is common for various microcontroller and IMU devices. The logic circuit 146, which is powered by one of the voltages from the voltage regulators 144, can be an OR gate performing a logical OR operation on the Vcc_primary voltage and a Vctrl signal from the recovery processor 130 as illustrated in FIG. 3. As such, powering on the primary operation system 104 would power on the recovery processor 130 and the recovery IMU 132 of the flight failure recovery system 106. Furthermore, powering off the recovery processor 130 and the recovery IMU 132 can be independent from the Vcc_primary voltage from the primary operation system 104 being low (i.e., the primary operation system 104 being shut off). In other embodiments, other logical circuitry can be used to implement such partially independent control of the recovery processor 130 and the recovery IMU 132 in case of the primary operation system 104 being shut off.

The recovery processor 130 can determine whether to shut off the recovery processor 130 itself and the recovery IMU 132 by generating the Vctrl signal accordingly. The recovery processor 130 can make such determination based on, for example, the battery levels of the primary battery 118 and the recovery battery 126 as the recovery processor 130 can be configured to monitor the battery levels and/or power supplied to the flight failure recovery system 106 from the primary operation system 104 using an internal (or external) analog-to-digital converter (ADC). The recovery processor 130 can further generate an appropriate Vctrl signal based on data it receives from the recovery IMU 132, which is in communication with the recovery processor 130 through a suitable communication protocol, such as serial peripheral interface (SPI). Further details of how the recovery processor 130 determines whether to shut itself (and the recovery IMU 132) off are discussed in connection with FIGS. 4-6 below. The recovery processor 130 can be also in further communication with the silicon-controlled rectifier 148 of the parachute deploy mechanism 128. For example, the silicon-controlled rectifier 148 can be a metal oxide semiconductor field effect transistor (MOSFET) or other semiconductor-controlled rectifier (SCR), which can be controlled by, for example, a signal from a general-purpose input/output (GPIO) pin of the recovery processor 130. In some embodiments, the parachute trigger 150 can be implemented with a fuse. The silicon-controlled rectifier 148 can be electrically connected to the parachute trigger 150, which in turn can be coupled to, for example, a mechanical spring to deploy a parachute (not shown) upon activation of the parachute trigger 150. As shown in dotted lines and discussed above in connection with FIG. 2 the recovery processor 130 is also in communication with the primary processor 110 (FIG. 2) through, for example, universal asynchronous receiver/transmitter (UART). In other embodiments, other communication protocol(s), such as universal synchronous/asynchronous receiver/transmitter (USART), RS-232, controller area network (CAN) bus, SPI, or any other suitable protocol can be used.

Figure 4:
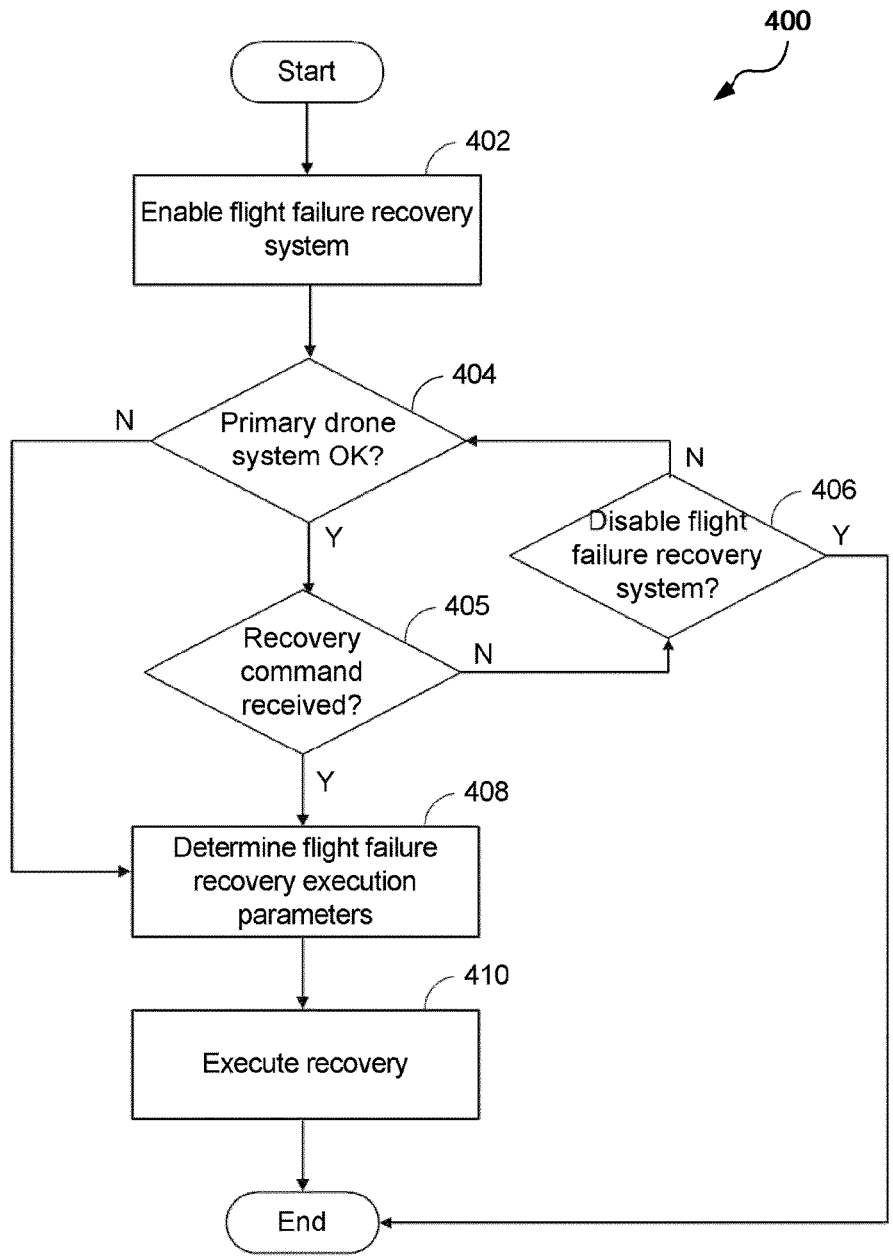
FIG. 4 is a flowchart for an example flight failure recovery process according to one embodiment.

FIG. 4 is a flowchart for an example flight failure recovery process according to one embodiment. In some instances, the flight failure recovery may involve parachute deployment and/or other form of controlled descent as discussed in connection with FIG. 2 above. The illustrated process 400 can be performed at least in part by the recovery processor 130 (FIGS. 2, 3) of the flight failure recovery system 106 (FIGS. 2, 3) discussed above in connection with FIGS. 2, 3. In some embodiments, the process 400 can be performed in part by the recovery processor 130 in conjunction with other modules the recovery processor 130 is in communication with, such as the primary processor 110 (FIG. 2). As the primary operation system 104 (FIGS. 2, 3) gets powered up, the recovery processor 130 can also be powered up as discussed above in connection with FIGS. 2, 3. In some embodiments, once the primary operation system 104 and the flight failure recovery system 106 are powered up, the primary processor 110 and/or the recovery processor 130 may perform preflight checks or other logic checks (e.g. recovery battery 126 output voltage is within acceptable range) to allow the process 400 to proceed.

In step 402, the flight failure recovery system 106 (FIGS. 2, 3) is enabled based on, for example, a command from the primary processor 110 (FIG. 2) to the recovery processor 130 (FIGS. 2, 3) to "arm" the parachute. It can be advantageous for the primary processor 110 to send an enabling command as it can be desirable not to enable parachute deployment when the unmanned aerial vehicle is powered on, but not flying, for example. In some embodiments, the recovery processor 130 may be configured to disregard the enabling command from the primary processor 110 when the recovery processor 130 determines that there is an error in either the primary operation system 104 (FIG. 2) or the flight failure recovery system 106 (FIGS. 2, 3). For example, in some embodiments, the primary processor 110 and/or the recovery processor 130 may perform pre-flight system check routine(s), and as part of the pre-flight system check the primary processor 110 and/or the recovery processor 130 may determine whether there is an error. In embodiments with the recovery processor 130 performing a pre-flight system check routine, the recovery processor 130 may, for example, determine that the recovery battery 124 (FIGS. 2, 3) is out of power or identify other errors or non-operational status in the flight failure recovery system 106. In case of an error, the recovery processor 130 may disregard an enabling, or "arm," command from the primary processor 110, which may not have received any indication of error during its own pre-flight system checks, if any. In some embodiments, the recovery processor 130 may communicate to the primary processor 110 confirming that the parachute is enabled once the recovery processor 130 determines that the parachute can be enabled. It can be advantageous to have confirmations between the processors 110, 130 to allow the processors 110, 130 to be in lockstep with each other. In other embodiments, a different sequence of commands or communications between the two processors 110, 130 with different level of priorities may be implemented to enable parachute deployment and confirm its enablement across the primary and recovery processors 110, 130. In some embodiments, complementary commands or communications disabling or disarming the parachute can be implemented as further discussed below in connection with step 406. Once the parachute is (and is confirmed to have been) enabled, the process 400 proceeds to step 404, and the unmanned aerial vehicle may be ready for a flight.

In step 404, whether the primary operation system 104 is in operational status without an error necessitating parachute deployment is determined. After step 402 and upon completion of other pre-flight preparations, the unmanned aerial vehicle can start its flight and perform missions in part by executing instructions in the primary processor 110 as discussed above in connection with FIG. 2. During a flight, the recovery processor 130, for example, may constantly and independently check whether the primary operation system 104 continues to be operational without error. The level of redundancy and independence in checking the status of the unmanned aerial vehicle may vary as the disclosure herein is implemented. Further details of checking the primary operation system 104 are discussed in connection with FIG. 5 below. If there is an error necessitating parachute deployment, the process 400 proceeds to step 408. If there is no error necessitating parachute deployment, the process 400 proceeds to step 405.

In step 405, whether any recovery command is generated directing deployment of the parachute is determined. In some embodiments, the recovery processor 130 may receive a recovery or "fire" command from the primary processor 110 instructing to deploy the parachute. The primary processor 110, for example, may have determined that one of its critical systems failed and a safe recovery through a parachute landing is necessary. The recovery processor 130 may also receive other information relating to the status of the aerial vehicle beyond the indication of error from the primary processor 110. In some embodiments, the primary processor 110 may be configured to turn off the motors 122 (FIG. 2) upon sending the "fire" command. It is also possible for the recovery processor 130 to be connected to the motor controllers so that it can turn off the propellers upon receiving the "fire" command, or upon otherwise determining that flight failure has occurred and descent is necessary. In some embodiments, the primary processor 110 can be configured to periodically send part or all of vehicle status information, such as data from the sensors 115 (FIG. 2), the GPS module 114 (FIG. 2), the transceivers 108 (FIG. 2), and the motor controllers 120 (FIG. 2) if the recovery processor 130 is not in direct communication with these modules of the primary operation system 104. In some embodiments, sending of periodic status information from the primary processor 110 to the recovery processor 130 can be implemented using heartbeat data packets at a certain frequency. In such embodiments, the recovery processor 130 not receiving an expected heartbeat data packet at a certain frequency may trigger the recovery processor 130 to determine that the unmanned aerial vehicle is in an emergency situation and initiate a recovery operation such as parachute deployment as disclosed herein. In other embodiments, the data from the primary operation system 104 may be communicated to the flight failure recovery system 106 only in certain events, such as when the primary processor 110 sends a system error signal or a parachute deployment command to the recovery processor 130. In some embodiments, the raw data from the primary operation system 104 may be directly forwarded to the recovery processor 130 for full redundancy, and in other embodiments, the data from the primary operation system 104 may be partially or fully processed by the primary processor 110, increasing interdependency between the primary operation system 104 and the flight failure recovery system 106. In some embodiments, extraneous, nonessential, predictable, or deducible data regarding parachute deployment may not be communicated to the recovery processor 130 to improve power efficiency, for example. In some embodiments, step 405 can be implemented as an interrupt in the recovery processor 130, and active checking of a receipt of the recovery command may not be necessary. If a recovery command is not received, the process 400 proceeds to step 406. If a recovery command is received, the process 400 proceeds to step 408.

In step 406, whether the flight failure recovery system should be disabled is determined. In some embodiments, the primary processor 110 may send a disable or "disarm" command to the recovery processor 130 upon landing of the unmanned aerial vehicle, for example. It can be advantageous for the primary processor 110 to send the disable command to the recovery processor 130 to disable the flight failure recovery operation, such as parachute deployment, when the unmanned aerial vehicle is not flying or the unmanned aerial vehicle is manually placed in a nonoperational orientation (e.g., upside down). In other embodiments, a different sequence of commands or communications between the two processors 110, 130 with different level of priorities may be implemented to disable parachute deployment and confirm its disablement across the primary and recovery processors 110, 130. In other embodiments, similar to the enable command discussed above in connection with step 404, the disable command may be disregarded by the recovery processor 130 if the recovery processor 130 independently determines that the primary operation system 104 erred in sending the disable command to the recovery processor 130. If it is determined that flight failure recovery should not be disabled, the process 400 proceeds to step 404. If it is determined that the parachute deployment should not be disabled, the process 400 proceeds to step 404. If it is determined that flight failure recovery should be disabled, the process 400 ends. In some embodiments, logic checks (such as making sure that the sensor inputs are consistent with the UAV being near the ground and moving slowly or not at all, the motors are off, or the like) can be performed before it is determined that the flight failure recovery system should be disabled and the process 400 be ended. In some embodiments, the recovery processor 130 may communicate to the primary processor 110 confirming that the parachute is disabled once the recovery processor 130 determines that the parachute can be disabled. It can be advantageous to have confirmations between the processors 110, 130 to allow the processors 110, 130 to be in lockstep with each other.

In step 408, execution parameters of the flight failure recovery process can be determined. Flight failure recovery execution parameters may include a timing for parachute deployment if and when it is determined that the parachute should be deployed. In other instances, parachute deployment may be unnecessary or unsuitable, and the recovery processor 130 may decide not to deploy the parachute and to execute an urgent controlled descent instead. The function of some embodiments distinguishes between the determination that flight failure has occurred and descent is necessary (which may trigger, for example, the fire signal described above by the primary operation system), and the actual deployment time of the mechanisms used during the descent that provide some control over the rate of descent, such as a parachute. Thus, in contrast to prior art systems, the actual deployment of the descent system, such as a parachute, may be delayed from the determination that the parachute should be deployed. Such a delay may be only a few seconds or less, but this delay can be used to help ensure that the deployment of the parachute (or other descent mechanism) occurs when there is a relatively good chance that the descent system will function as intended. Accordingly, in some embodiments, the recovery processor 130 may determine a suitable time to deploy the parachute based on the status of the unmanned aerial vehicle during a time period following the determination of flight failure or, for example, receipt of the "fire" command from the primary operation system. The recovery processor 130, for example, may monitor the orientation or attitude of the unmanned aerial vehicle using the recovery IMU 132 and possibly also the last known state communicated from the primary operation system 104 and perform a predictive analysis to determine one or more optimal deployment times that reduces the chance of parachute entanglement or any other complications that are likely to cause an unsuccessful parachute landing. In some embodiments, the recovery processor 130 may not require further communication with or data from the primary operation system 104 or its processor 110 as the recovery processor 130 has obtained all necessary data and the primary operation system 104 can be considered unreliable. In other embodiments, the recovery processor 130 may be in further communication with part(s) of the primary operation system 104 that the recovery processor 130 has determined to be functional and helpful in parachute deployment. For example, the recovery processor 130 may be in further communication with the primary operation system 104 to control some of the motors 122 that are operational to adjust the attitude of the unmanned aerial vehicle to increase the chance of a successful parachute landing or perform other flight failure recovery processes such as controlled descent. In some cases, the time selected by the recovery processor 130 can be less than optimal depending on the feasibility of reaching the optimal time. Further details regarding how a deployment time is determined is discussed in connection with FIG. 6 below. When a suitable parachute deployment time is and can be determined and selected, the process 400 proceeds to step 410. In some embodiments, it may be determined that parachute deployment is unnecessary or a controlled vertical descent is better suited for a given situation. Further details of such embodiments are discussed in connection with FIG. 6 below.

In step 410, flight failure recovery is executed. In some instances, the parachute can be deployed at the time selected in step 408. In other instances, the parachute may not be deployed, and the unmanned aerial vehicle may perform a controlled vertical descent. In other instances, a combination of parachute deployment and controlled descent can be performed to maximize a successful landing. In some embodiments, at the selected time of deployment, the recovery processor 130 may send a signal to the parachute deploy mechanism 128 to deploy the parachute according to the details of the parachute deploy mechanism 128 discussed above in connection with FIG. 3. When the flight failure recovery is executed (e.g., the parachute is deployed at the selected time, controlled descent is performed), the process 400 ends.

Figure 5:
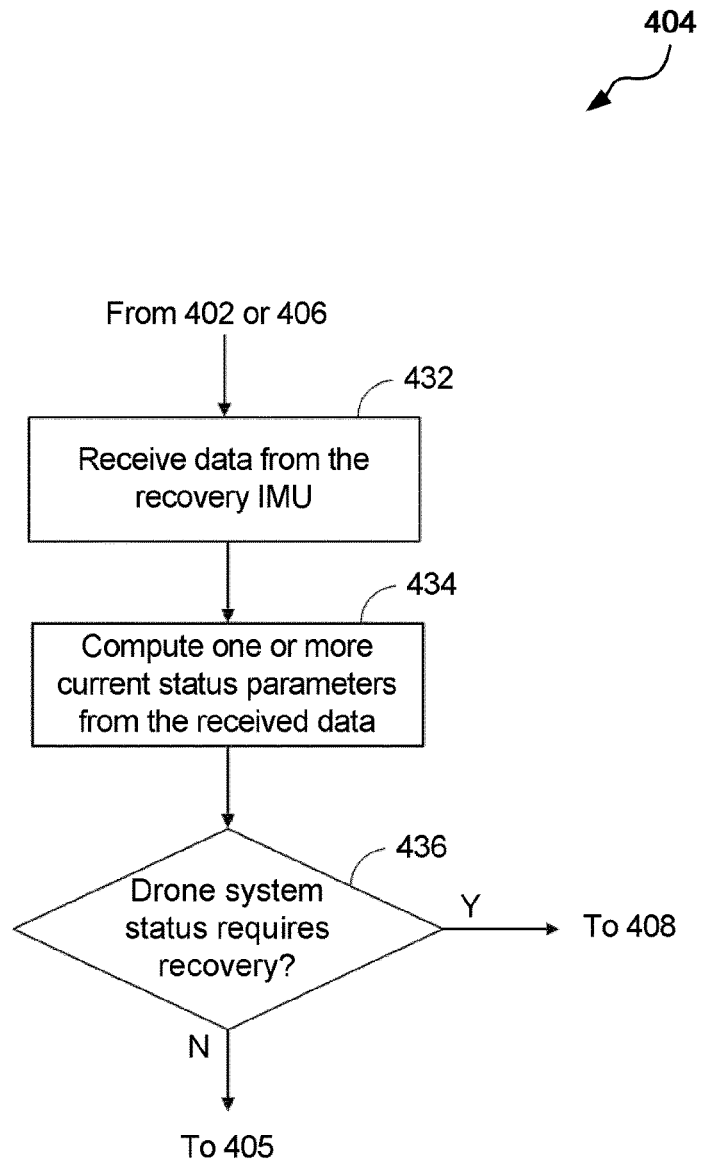
FIG. 5 is a flowchart for part of the example flight failure recovery process of FIG. 4.

FIG. 5 is a flowchart for part of the example parachute recovery process of FIG. 4. The flowchart in FIG. 5 illustrates step 404 discussed above in connection with FIG. 4 in further detail. When the parachute deployment is enabled in step 402 (FIG. 4), the illustrated process proceeds to step 432.

In step 432, data indicating the status of the unmanned aerial vehicle can be obtained. In some embodiments, the recovery processor 130 (FIGS. 2, 3) can receive various data from the recovery IMU 132 (FIGS. 2, 3), such as accelerometer, gyroscope, and barometer data. Additionally, the recovery processor 130 may receive other data related to the state of the unmanned aerial vehicle, such as altitude, velocity, and attitude from the primary operation system 104, either received periodically (e.g., heartbeat) or transmitted or retrieved in certain events (e.g., upon the "fire" command). It is to be noted that steps 432, 434, and 436, and other similar steps may be continuously, periodically, intermittently, repeatedly, or iteratively performed, and the illustrated process in FIG. 5 only shows one example pathway of the comprehensive process(es) within step 404 (FIG. 4) in determining whether the unmanned aerial vehicle is operational or requires parachute deployment. Steps 432, 434, and 436 may be implemented with a state machine, for example, for the recovery processor 130 to decide whether any recovery action, such as deployment of the parachute, is necessary.

In step 434, from the various data received in step 432, the status of the unmanned aerial vehicle can be determined. In some embodiments, the recovery processor 130 can process the received data and compute one or more parameters based on the received data. For example, from the accelerometer data, the recovery processor 130 may determine the unmanned aerial vehicle is in freefall. In another instance, from the gyroscope data, the recovery processor 130 may determine the unmanned aerial vehicle is in an unrecoverable state (e.g., upside down).

In step 436, based on the computations from step 434, whether the flight failure recovery should be executed is determined. For example, when the recovery processor 130 determines that the unmanned aerial vehicle is upside down when it is supposed to be flying and performing missions in the right-side up orientation, the recovery processor 130 may determine that flight failure recovery is necessary regardless of seemingly normal signals it may receive from the primary operation system 104 (FIG. 2). In some embodiments, irregularities occurring between the primary operation system 104 and the flight failure recovery system 106 may not necessarily mean an emergency situation necessitating flight failure recovery, such as a parachute deployment. For example, as described in connection with FIG. 2 above, in some embodiments, the recovery processor 130 may monitor the unmanned aerial vehicle power level. When the recovery processor 130 determines that power from the primary operation system 104 is lost and no further heartbeats are communicated, for example, the recovery processor 130 may independently determine whether the unmanned aerial vehicle is still in operation (e.g., flying, hovering, etc.) or in freefall. It will be appreciated that a variety of schemes may be used to handle apparent conflicts between data being received from sensors separately associated with the primary operation system 104 and the flight failure recovery system 106. Generally, the sensor/system that is the simplest mechanically and/or electronically will be considered the reliable one if the two systems are indicating a different status for the UAV. It is also possible to include redundant IMUS in the flight failure recovery system. If it is determined that the flight failure recovery should be executed the illustrated process proceeds to step 408 (FIG. 4). If it is determined that the flight failure recovery need not be executed, the illustrated process proceeds to step 405 (FIG. 4).

Figure 6:
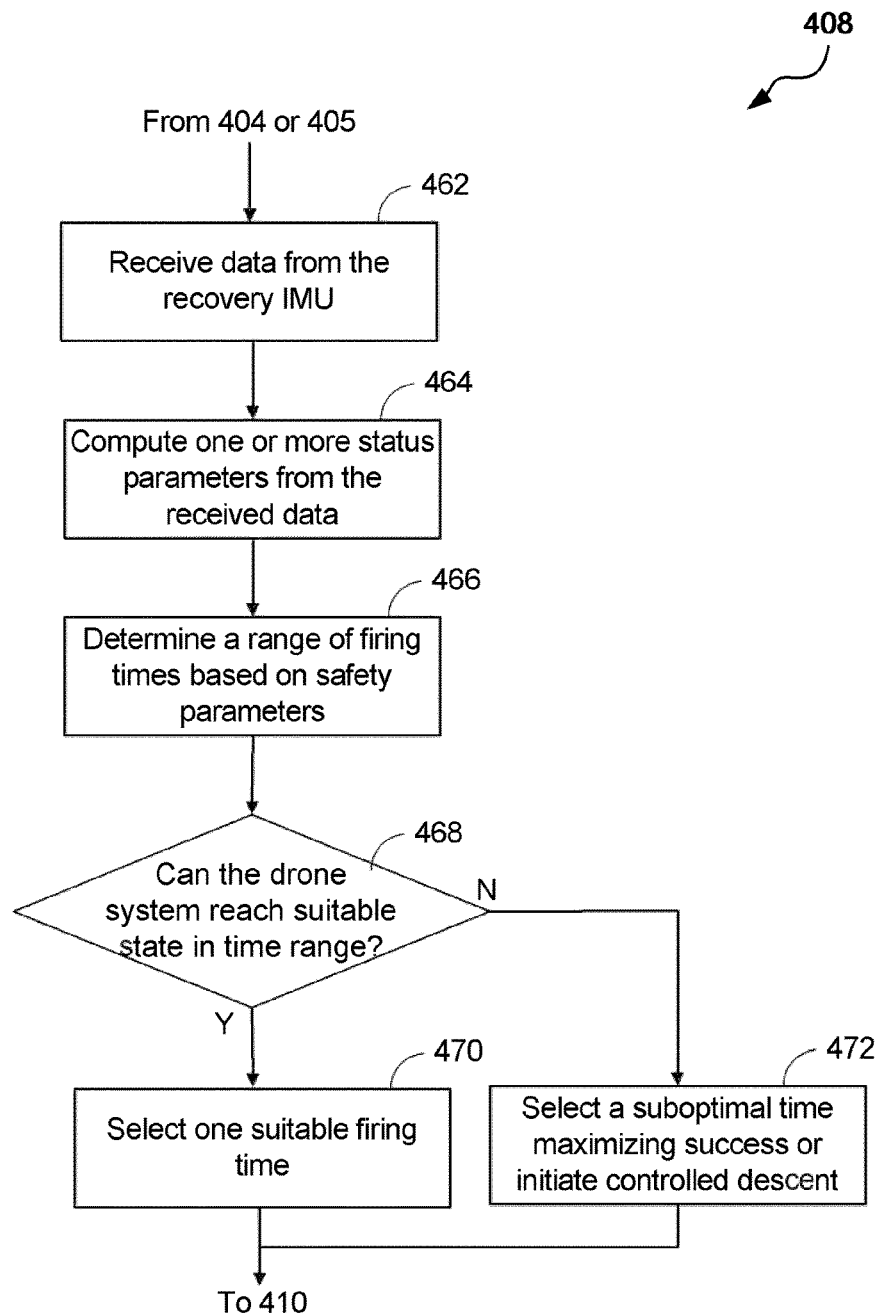
FIG. 6 is a flowchart for another part of the example flight failure recovery process of FIG. 4.

FIG. 6 is a flowchart for another part of the example flight failure recovery process of FIG. 4. The flowchart in FIG. 6 illustrates step 408 discussed above in connection with FIG. 4 in further detail. When it is determined that the flight failure recovery should be executed in step 404 or in 405, the illustrated process proceeds to step 462.

In step 462, data indicating the status of the unmanned aerial vehicle can be obtained. In some embodiments, the recovery processor 130 can receive various data from the recovery IMU 132, such as accelerometer and gyroscope data. The recovery processor 130 may also have received other data related to altitude, velocity, and attitude from the primary operation system 104 as they can be received periodically or transmitted or retrieved upon the recovery ("fire") command in step 405 (FIG. 4). In some embodiments, parts of steps 462 and 464 obtaining data may be omitted as some of the requisite data may have already been received upon the decision to deploy the parachute. It is to be noted that the steps illustrated in FIG. 6 may be continuously, periodically, intermittently, repeatedly, or iteratively performed, and the illustrated process in FIG. 6 only shows one example pathway of the comprehensive process(es) within step 408 (FIG. 4) in determining and selecting flight failure recovery execution parameters, such as the parachute deployment time.

In step 464, from the various data received in step 462, the current and projected status of the unmanned aerial vehicle can be determined. In some embodiments, the recovery processor 130 can process the received data and compute one or more parameters based on the received data. For example, after it is decided that the parachute should be deployed, the recovery processor 130 may continue its communication with the recovery IMU 132 (FIG. 2) and integrate the gyroscope rates from the last known primary attitude to estimate the current attitude of the unmanned aerial vehicle. It can be advantageous to process the gyroscope data to determine the unmanned aerial vehicle status because in case of freefall, the accelerometer data may not be used to determine the attitude, and the gyroscope drift may not be significant during a short time frame this computation takes place (e.g., a few seconds during a freefall). Also for example, a sensor fusion filter, such as a Kalman filter or other filter, can be used to estimate the velocity and position of the unmanned aerial vehicle. To determine the altitude above ground, the world elevation map, LIDAR, ultrasound, barometer, or other mechanisms may be used as discussed above in connection with FIG. 2.

In step 466, one or more parachute deployment times can be determined. The recovery processor 130 may determine various optimal times (e.g., local maxima/minima) or a range of similarly or equally optimal times depending on various safety parameters. Some example safety parameters may include the speed or velocity high enough to allow enough airflow for the parachute, the altitude high enough (e.g., 15 meters) above ground to allow full parachute deployment, the attitude level enough to allow an upward parachute launching without tangling, and the propeller off status to disallow tangling. In one embodiment, the recovery processor 130 may determine the earliest and latest times for parachute deployment based on the velocity and position of the unmanned aerial vehicle. During this suitable range of times, the recovery processor 130 may get the estimated attitude of the unmanned aerial vehicle as discussed above in step 464 to determine the parachute deployment time. In some embodiments, based on the estimated status of the unmanned aerial vehicle, the recovery processor 130 may perform a predictive analysis to estimate the attitude and velocity of the unmanned aerial vehicle up until the time it would hit the ground or for a set period of time in the future from the current time, for example. For instance, if the unmanned aerial vehicle is rolling during its freefall, the recovery processor 130 may predictively estimate various attitudes of the unmanned aerial vehicle for a few seconds ahead. Based on its predictive analysis, the recovery processor 130 may determine at what attitude, velocity, and altitude in the future would be optimal for parachute deployment.

In step 468, whether the parachute can be deployed at one of the suitable times is determined. In one embodiment, the recovery processor 130 may determine whether one of the suitable deployment times can be reached based on the current and/or expected status of the unmanned aerial vehicle. For example, in certain instances the unmanned aerial vehicle may not reach the required velocity in time before it would be too close to ground. In other cases, the unmanned aerial vehicle is in a suboptimal attitude (e.g., tilted too much) and its attitude is not predicted to be more optimal (e.g., more level) in time before it gets too close to ground. An example suboptimal attitude may be 60 degrees from vertical for a typical quadcopter with the parachute located near the center of mass of the unmanned aerial vehicle, but it may vary depending on the design of the unmanned aerial vehicle and the parachute. In embodiments and circumstances allowing partial control of the primary operation system 104 (FIG. 2) with the recovery processor 130 (FIGS. 2, 3), adjustment of the unmanned aerial vehicle status (e.g., attitude) using parts of the primary operation system 104 can also be considered when determining whether a suitable time can be reached.

In other instances, even with all the safety parameters being satisfactory at the time, deploying the parachute too high above ground can result in the unmanned aerial vehicle being carried far away from its preferable landing location especially if it is too windy. If the unmanned aerial vehicle is still too high at the latest suitable deployment time, it may be desirable to select a suboptimal time depending, for example, unpredictable weather conditions or terrestrial surroundings (e.g., near a lake and the air drift is unpredictable). Also in some instances, the unmanned aerial vehicle may be spinning or rolling, and a delay between the recovery processor 130 signaling deployment and actual deployment may be significant as the attitude of the unmanned aerial vehicle is constantly changing. In such instances, the recovery processor 130 may take the delay into account based on a predictive analysis and intentionally select a suboptimal time so that the parachute can actually be deployed at an appropriate time for a desirable outcome. If the parachute can be or should be deployed at one of the suitable times the illustrated process proceeds to step 470. If the parachute cannot be or should not be deployed at one of the suitable times, the illustrated process proceeds to step 472. In some instances, it can be determined that deploying the parachute is not necessary or unsuitable in step 468.

In step 470, one of the suitable parachute deployment or firing times can be selected. In some instances, various suitable times may have about equal chance of success, and any of those times can be selected for deployment. If the unmanned aerial vehicle is high above the ground, the latest of the suitable deployment times can be selected to minimize drifting, for example. When a suitable parachute deployment time is selected the illustrated process proceeds to step 410.

In step 472, one of the suboptimal parachute deployment times can be selected or controlled vertical descent can be initiated if possible. As discussed above in connection with step 468, in some instances one of the suitable times cannot be reached or it is more advantageous to intentionally select a suboptimal deployment time. In such instances, one of the suboptimal times that would maximize success can be selected depending on other attendant circumstances (e.g., circuit delay, weather condition, etc.) beyond the safety parameters considered in step 466. In other instances, it can be determined deploying the parachute is not necessary or suitable. When a suboptimal parachute deployment time is selected or if it is determined that a controlled descent should be performed instead, the illustrated process proceeds to step 410.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the Figures depict example arrangements of elements and components, additional intervening elements, devices, features, or components may be present in an actual embodiment (assuming that the functionality of the depicted circuits is not adversely affected).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the implementations are not limited to the precise configuration and components illustrated above. Various modifications, changes and variations may be made in the arrangement, operation and details of the methods and apparatus described above without departing from the scope of the implementations.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well.

What is claimed is:

1. An unmanned aerial vehicle comprising:
a primary operation system in communication with a primary state estimator, the primary operation system being configured to operate the unmanned aerial vehicle based in part on the primary state estimator; and
a flight failure recovery system in communication with the primary operation system and a recovery state estimator different from the primary state estimator, the flight failure recovery system being configured to determine a suitable time to generate a deploy signal based at least in part on one or more signals from the recovery state estimator and one or more signals sent to the flight failure recovery system from the primary operation system during a time period following a determination of flight failure, and wherein the suitable time is determined by a predictive analysis provided by the flight failure recovery system that determines one or more predictive analysis optimal deployment times, the one or more predictive analysis optimal deployment times reducing parachute entanglement and parachute complications that cause an unsuccessful parachute landing.

2. The unmanned aerial vehicle of claim 1, wherein the flight failure recovery system comprises a parachute.

3. The unmanned aerial vehicle of claim 1, wherein the primary operation system is further configured to generate a recovery command signal indicating error in the primary operation system, and the flight failure recovery system is configured to receive the recovery command signal from the primary operation system.

4. The unmanned aerial vehicle of claim 1, wherein the flight failure recovery system is further configured to:
   determine primary operation status indicating reliability of the primary operation system based in part on one or more signals from the recovery state estimator; and
   generate the deploy signal further based at least in part on the primary operation status.

5. The unmanned aerial vehicle of claim 4, wherein the primary operation status indicates the primary operation system is reliable and the flight failure recovery system is configured to generate the deployment signal further based on the error signal from the primary operation system.

6. The unmanned aerial vehicle of claim 1, wherein each of the primary state estimator and the recovery state estimator comprises an inertial measurement unit (IMU).

7. The unmanned aerial vehicle of claim 3, wherein the suitable time to generate the deploy signal is based on at least one of:
   the altitude of the unmanned aerial vehicle approximately when the flight failure recovery system receives the recovery command signal;
   the velocity of the unmanned aerial vehicle approximately when the flight failure recovery system receives the recovery command signal;
   the attitude of the unmanned aerial vehicle approximately when the flight failure recovery system receives the recovery command signal; and
   one or more signals from the recovery state estimator after the flight failure recovery system receives the recovery command signal.

8. The unmanned aerial vehicle of claim 7, wherein the suitable time is based on the attitude of the aerial vehicle system determined from a gyroscope signal from the recovery state estimator using a sensor fusion filter.

9. The unmanned aerial vehicle of claim 7, wherein the flight failure recovery system is further configured to determine whether to generate the deployment signal at the suitable time.

10. The unmanned aerial vehicle of claim 1, wherein the flight failure recovery system is further configured to send one or more signals to the primary operation system to control at least part of the primary operation system.

11. A method for recovering an unmanned aerial vehicle comprising:
   operating the unmanned aerial vehicle based at least in part on a primary operation system containing at least a primary state estimator;
   determining that flight failure has occurred; and
   determining a suitable time to generate a deploy signal based at least in part on one or more signals from a flight failure recovery state estimator different from the primary state estimator, and one or more signals from the primary operation system following the determination of flight failure, wherein the suitable time is determined by a predictive analysis provided by the flight failure recovery system that determines one or more predictive analysis optimal deployment times, the one or more predictive analysis optimal deployment times reducing parachute entanglement and parachute complications that cause an unsuccessful parachute landing.

12. The method of claim 11 further comprising generating a recovery command signal indicating error in a primary operation system of the unmanned aerial vehicle.

13. The method of claim 12 further comprising:
   determining primary operation status indicating reliability of the recovery command signal based in part on one or more signals from the flight failure recovery state estimator; and
   generating the deployment signal further based at least in part on the primary operation status.

14. The method of claim 13, further comprising generating the deployment signal further based on the recovery command signal, wherein the primary operation status indicates the recovery command signal is reliable.

15. The method of claim 11, wherein each of the primary state estimator and the recovery state estimator comprises an inertial measurement unit (IMU).

16. The method of claim 12, wherein the suitable time to generate the deploy signal is based on at least one of:
   the altitude of the unmanned aerial vehicle approximately when the recovery module receives the recovery command signal;
   the velocity of the unmanned aerial vehicle approximately when the recovery module receives the recovery command signal;
   the attitude of the unmanned aerial vehicle approximately when the recovery module receives the recovery command signal; and
   one or more signals from the recovery state estimator after receiving the recovery command signal.

17. The method of claim 16, wherein the suitable time is based on the attitude of the aerial vehicle system determined from a gyroscope signal from the recovery state estimator using a sensor fusion filter.

18. The method of claim 16 further comprising determining whether to generate the deployment signal at the suitable time.

19. The method of claim 11 further comprising generating one or more recovery control signals to control at least part of the unmanned aerial vehicle.

20. An intelligent emergency parachute deployment system for an unmanned aerial vehicle, the system comprising:
   a parachute deployment system;
   a dedicated inertial measurement unit (IMU) comprising a gyroscope and an accelerometer; and
   a processor coupled to the dedicated IMU, the parachute deployment system, and a primary operation system for the unmanned aerial vehicle;
   wherein, after a determination of flight failure, the processor is configured to monitor signals from the dedicated IMU to determine when to deploy the parachute based on altitude, velocity, and attitude of the unmanned aerial vehicle to enhance the chance of successful deployment of the parachute, and wherein the processor is configured to determine the suitable time by a predictive analysis provided by the flight failure recovery system that determines one or more predictive analysis optimal deployment times, the one or more predictive analysis optimal deployment times reducing parachute entanglement and parachute complications that cause an unsuccessful parachute landing.

21. A method for flight failure recovery of an unmanned aerial vehicle comprising:

operating the unmanned aerial vehicle with a first processor based in part on signals received by the first processor from a primary state estimator;

determining by the first processor that flight failure has occurred; and after determining that flight failure has occurred, determining a suitable time to generate a flight failure recovery signal with a second processor based at least in part on one or more signals from a flight failure recovery state estimator different from the primary state estimator and one or more signals sent to the second processor from the first processor, wherein the suitable time is determined by a predictive analysis provided by the flight failure recovery system that determines one or more predictive analysis optimal deployment times, the one or more predictive analysis optimal deployment times reducing parachute entanglement and parachute complications that cause an unsuccessful parachute landing;

wherein the primary state estimator comprises a primary inertial measurement unit (IMU), the primary IMU comprising one or more gyroscopes, accelerometers, magnetometers, and/or barometers;

wherein the recovery state estimator comprises a recovery inertial measurement unit (IMU), the recovery IMU comprising one or more gyroscopes, accelerometers, magnetometers, and/or barometers; and wherein the first processor, second processor, primary state estimator, and recovery state estimator reside on the unmanned aerial vehicle.

22. The method of claim 21, wherein the flight failure recovery signal initiates a parachute deployment.

23. The method of claim 21 further comprising determining whether at least part of the unmanned aerial vehicle is operational.

24. The method of claim 23, wherein the flight failure recovery signal initiates a controlled vertical descent.

* * * * *